United States Patent
Nilsson et al.

[11] Patent Number: 6,117,583
[45] Date of Patent: Sep. 12, 2000

[54] LEAD BATTERY

[75] Inventors: Ove Nilsson, Nol; Erik Sundberg, Helsingborg, both of Sweden

[73] Assignee: Advanced Power Devices, Inc., Salisbury, Md.

[21] Appl. No.: 08/898,206

[22] Filed: Jul. 22, 1997

Related U.S. Application Data

[63] Continuation of application No. 08/718,535, Sep. 19, 1996, abandoned.

[30] Foreign Application Priority Data

Mar. 22, 1994 [SE] Sweden .................................. 9400946
[51] Int. Cl.$^7$ ................................................... H01M 10/16
[52] U.S. Cl. ........................... 429/66; 429/164; 429/204; 429/208; 429/225
[58] Field of Search ............................. 429/66, 163, 164, 429/204, 225, 226, 227, 208, 209

[56] References Cited

U.S. PATENT DOCUMENTS 3,856,575  12/1974  Hughes .................... 429/164
4,336,314   6/1982  Yonezu et al. ............. 429/66
4,729,933   3/1988  Oswald .................... 429/59

*Primary Examiner*—John S. Maples
*Attorney, Agent, or Firm*—Law Offices of John A. Parrish II

[57] ABSTRACT

The invention concerns a lead-acid battery having all the surfaces of all the electrodes under high pressure and their circumferences kept unchanged by support from mechanically rigid cell walls such that only the thickness of the electrodes is allowed to expand under strong resilient load during the discharge and return during charge. The pressure is $0.49 \cdot 10^5 - 9.81 \cdot 10^5$ Pa (0.5–10 kp/cm$^2$), and may be obtained by separators or by springs applied to the outer sides of the cell container and may be changed for increased or decreased capacity. The construction of the tubular battery design, prevents material losses due to sludging and a long working life is obtained, since also a totally corroded lead conductor under high pressure may function as a current conductor. The rigid outer containers also allow high liquid pressure and thus a high oxygen solubility and oxygen recombination for sealed cells.

26 Claims, 2 Drawing Sheets

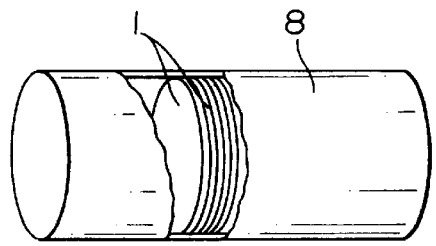
FIG. 1  FIG. 2
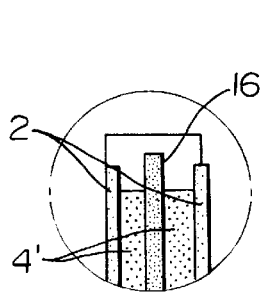
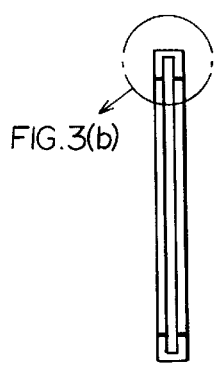
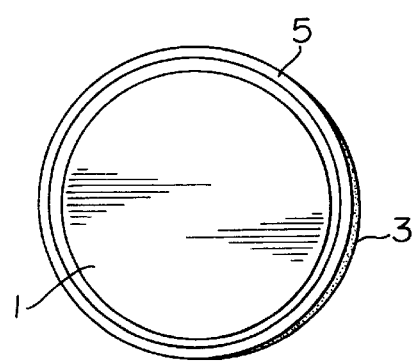
FIG. 3(b)  FIG. 3(a)  FIG. 3(c)
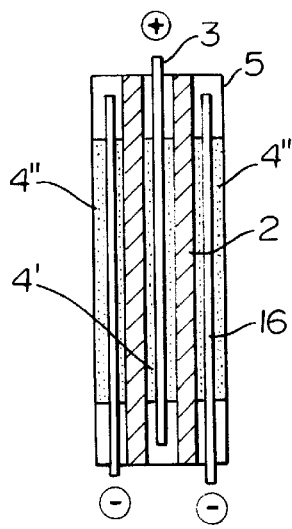
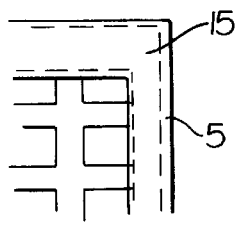
FIG. 4  FIG. 5A  FIG. 5B  FIG. 5C

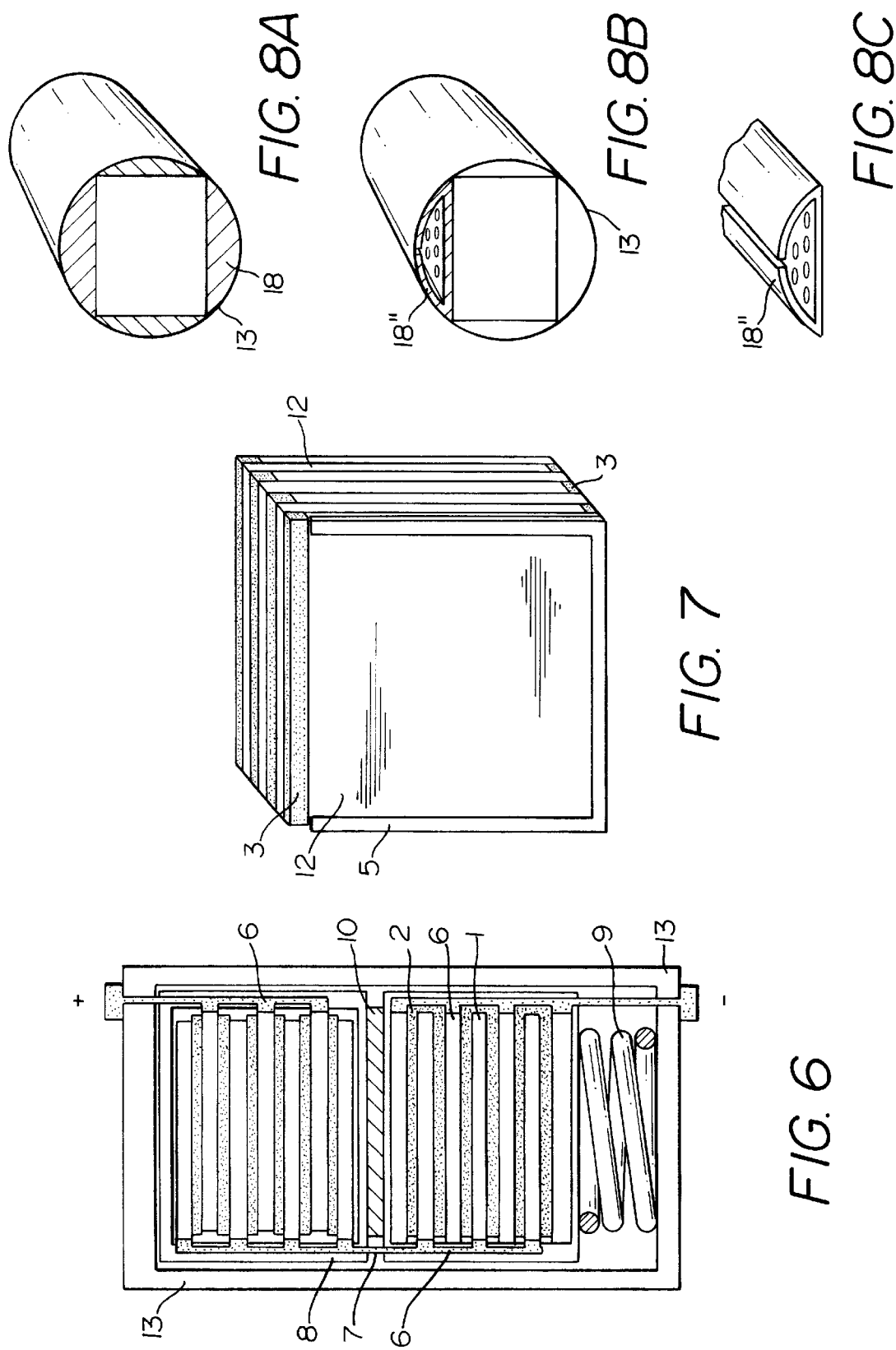

LEAD BATTERY

This application is a continuation of Ser. No. 08/718,535, filed Sep. 19, 1996, now abandoned.

The electrodes in a lead acid battery are formed by current conducting lead grids being filled with active lead material. Positive material is named PAM and negative material NAM. The most common type of electrodes are those called "pasted" plates having the current conductor designed as a grid. Between the positive and negative electrodes, or the "plates", porous separators are placed. Usually several positive and negative electrodes are mutually connected in parallel to form a "group of plates" or a cell. The current passes from the electrodes via current conductors in the upper part of the electrodes, so called lugs which are soldered to "bars", which are connected to the so called terminals. The cells are usually connected in series to form batteries with higher voltages.

During the discharge, $PbSO_4$ with larger volume than Pb and $PbO_2$ is formed within the electrodes. During discharges without any support of the electrodes, the active material will expand. This volume expansion is permanent if a resilient counter pressure is not applied. During each new discharge there is a certain increase of volume, the paste will crack and after a number of discharges positive paste (PAM) will fall out from the electrode, (the grid).

There is no corrosion within the negative electrodes. Thus only a moderate mechanical support is needed to get an almost reversible process. The surface of the positive lead grid is formed to $PbO_2$. The $PbO_2$ thus formed takes up a larger volume than the lead from which it is formed and strain will occur in the corrosion layer. During successive discharges there is some discharge of the $PbO_2$ on the grid surface and because of the volume growth cracks will occur, more lead is formed to $PbO_2$ and the grids will corrode.

The experience shows that mechanical pressure on the electrode surfaces will increase the working life. Batteries with so called pasted plates thus often comprise glass wool between the electrodes, and the cells are assembled into blocks with mechanical pressure against the cell walls and thereby also on the electrode surfaces. This pressure is maintained by assembling the groups into cell containers under pressure or into blocks of cell containers (starting batteries) having enough strength to counteract the volume increase.

In order to obtain at long working life, the positive active material, PAM, in batteries intended for longer discharges comprises high density i.e. low porosity with correspondingly lower material utilisation and thus lower capacity.

In so called tubular batteries the current conductor of the positive electrode consists, unlike in pasted plates, of parallel lead rods surrounded by active positive material which in turn is mechanically supported by surrounding porous tubes. The material of the tubes usually is comprised of braided or woven glass fibres. The diameter of these tubes is usually between 8–10 mm defining the width of the electrode. These positive electrodes are called "tube plates". One reason for tubular batteries with tubes of glass fibres having high paste porosity, i.e. low density, and thus good paste utilisation and yet long life, is that the paste is allowed to expand somewhat in the tubes by elastic elongation of the glass wool fibres and increasing tube diameter. This can cause more than 10% increase of volume during discharge. During charge the strained glass wool fibres return the volume of the positive paste to its state before the discharge. The strength of the glass fibres will however be reduced during the time.

WO 85/05227 (Sundberg) concerns a device having semi-tubes, however without support in all directions. Also the lug lacks support.

Also in batteries with pasted plates the compressed and relatively thick glass wool, which often is used as the separator, has a certain resilient effect. In batteries having rectangular containers this pressure exercised against the flat cell walls is insufficient to counteract the expansion. The free volume above and below the electrodes allow some expansion, and since the electrodes are not entirely supported by the walls of the container, they can also grow somewhat in width. The battery according to U.S. Pat. No. 4,336,314 has rectangular plates which however lack support for upper and lower electrode sides. DE-2 758 288 concerns a sealed oxygen recombination cell but does not mention support for electrode sides.

Also in known batteries having the cells essentially entirely enclosed inside a plastic material, the resilience of the flat walls will bring about insufficient support (JP 59-98476 and 60-74360).

The problems with the known batteries are solved by the features according to the characterizing portions of the independent claims.

According to this invention which concerns lead batteries with long working life, all the outer surfaces of the electrodes are put under high mechanical pressure and the projected electrode surface is maintained unchanged through absolute support from all sides.

The invention will now be described in light of embodiments and with reference to the drawings, wherein:

BRIEF DESCRIPTION OF THE DRAWINGS

FIG. 1 shows an embodiment of the invention according to the invention,

FIG. 2 shows an electrode with a lug,

FIG. 3 shows an electrode with detail in an enlarged scale,

FIG. 4 shows an electrode pile,

FIGS. 5a, b and c show different arrangements for securing the positive material, FIG. 6 shows a two cell battery according to the invention, FIG. 7 illustrates a principle with respect to rectangular plates, and FIGS. 8a, b and c show volume filling arrangements inside a battery container.

One example of obtaining such a support is illustrated in FIG. 1. Here the electrodes 1 in FIG. 1 are assembled in tubular, constant volume containers 8 which, through the cell container (FIG. 1) or the support from an outer container (13 in FIG. 6) support the circumferences of the electrodes (in first directions, which by the container or the vessel is defined as radial directions) in order to get an unchanged electrode surface area. Through high mechanical pressure on the electrode surface (in a second direction, which is defined by the container or the vessel as axial) and constant volume of the electrode group, the working life can be maximised since the corrosion during charging is controlled. Higher pressure limits the depth of the discharge. During the discharge, lead sulphate is formed which comprises essentially larger volume than the $PbO_2$. When the pores in the positive electrodes are filled with lead sulphate and the expansion is prevented by an outer counter pressure, no more electrolyte can diffuse into the electrode and the discharge is terminated.

With sufficient pressure and support, the expansion stops and the corrosion decreases. Because of an absolutely unchanged volume the working life will be multiplied.

The corrosion of positive lead grids can not be avoided, since the grids have a possibility of a volume increase at the expense of the volume of the porous active material. Compressed $PbO_2$ has, however, a significantly better current conductivity than the porous paste, and the $PbO_2$ which is formed by grid corrosion has a high density and a good electric conductivity: about 1/10 of that of lead. It is known that completely corroded lead spines in tubular batteries, where the pressure in the tubes is high, may act as current conductors during many years, giving the battery good capacity at not too high loads. In the same way these volume controlled batteries, where the whole group is under high mechanical pressure, obtain a very long life and function with full capacity during many thousand discharges also with completely corroded current conductors.

Also a new battery can be made without the lead grid. Thus a thin lead foil is firstly formed to PAM, and already during the formation the lead corrodes to $PbO_2$. In order to handle the plates during manufacture, a plastic grid may be used. Use of plastic grids in negative electrodes is previously known.

The pressure on the positive electrode surfaces can be resilient (spring action), since a small expansion of the paste during discharge can be allowed without influencing the working life of the material, provided the pressure on the electrode surface is sufficiently high so that the volume retains its original volume after a discharge and the subsequent charge. Without this expansion the supply of electrolyte to the active material in the electrode will decrease when the pores of the paste are filled with lead sulphate and thus the capacity will be reduced.

In a battery under pressure according to the invention a controlled expansion of the paste during discharge and compression during charge can be obtained by resilient separators or by a resilient element, e.g. a rubber seal being placed in the cells or in the batteries, and providing pressure on the electrode surface.

This effect has been applied in certain tubular batteries with elastic tubes and to some extent in pasted batteries with flexible separators, but the effect is significantly better in a construction with fix, unchanged electrode area according to the invention. The active material is allowed to expand during the discharge only perpendicular to the surface of the electrode (in the second or axial direction) and not in the plane of the electrode (in the first or radial directions). During the charge the expansion is pressed back. A certain resilient effect can be obtained with separators made from relatively thick, compressed glass wool and this is part of this invention.

With the high pressure on the pasted surface in batteries according to the invention, the expanding property of ordinary glass wool is not always sufficient and an extra spring load on the electrode group may be necessary.

In order to fully regulate and limit the discharge, the pressure on the electrode surfaces must be high, from 0.5 up to 10 kp/cm² ($0.49 \cdot 10^5$–$9.81 \cdot 10^5$ Pa), or higher. The pressure on the electrode surface will determine also the depth of the discharge, because of the volume increase limitation and thus the supply of electrolyte. The pressure is limited to what the separators can withstand before breaking. If springs are used to control the volume, it is easy to vary the pressure according to the application, (desired capacity) by using springs with different spring constant. Less pressure may lead to higher capacity, but also shorter life. In a battery according to the invention directed to having long working life, a mechanical pressure of $0.98 \cdot 10^5$–$9.81 \cdot 10^5$ Pa is preferred and in a battery directed to high capacity a mechanical pressure of $0.49 \cdot 10^5$–$0.98 \cdot 10^5$ Pa. Expansion, i.e. the increase of the electrode thickness, of up to 15% is possible with the corresponding shrinking during charge.

To be able to prevent the surface area of the electrode to increase, an outer container with constant volume e.g. a steel or composite tube is used and the cells are made with preferable almost circular plates, FIG. 2, and the cell group will have the shape of a tube, FIG. 1.

By the high pressure of porous glass wool against the electrode surfaces, no paste can leave the electrode and no extra space (sludge volume) for fallen out material is needed. The cells will therefore have a smaller volume than corresponding cells according to the previous art.

In cells according to the invention, the circular electrodes may have one or more "lugs" 3, more like low ridges, on the sides. These lugs may extend over almost the half circumference for the best current distribution. The lugs with connections are included in the circular electrode. FIG. 3 shows an electrode 1 which has the grid filled with active paste material 4'. The electrode is provided with a current connector in the form of a lug 3. In order to prevent short circuits the circumferences of both the positive and the negative electrodes are protected by a U-profile 5 of a plastics material which envelopes the edges of the electrodes or the electrode paste according to FIGS. 3, 4, 5. If the frames of the electrode are made from a plastics material, the U-profile is not always necessary.

The wall thickness of the U-profile may be thin, preferably 0.1–0.3 mm and a thickening of the plate at the edges by some tenth of a mm will appear. This thickening will however be pressed into the separators and is in general of no concern. If stronger profile is desired, it can be put onto the lead grid before the application of the active paste 4', 4", so that the U-profile then determines the thickness of the electrode as shown in FIG. 5. At the current connector, the lug 3, the U-profile 5 may have a recess, so that the lugs 3 from the positive and the negative plates protrude, as is shown in FIG. 4, through the U-profile, such that they can then be welded to a current conductor bar 6 in FIG. 6.

The positive and negative lugs are preferable arranged opposite to each other and the positive and negative current connector lugs 3 are situated at the opposite sides of the cell, and this construction is part of the invention. FIG. 6 shows a twin cell battery. The coupling, i.e. the connection 7 to the next cell is therefore also provided at opposite sides. The conductor 7 can have the shape of an expansion coil to allow some movability. The lugs 3 are welded to the bar 6 which is embedded in the container wall 8. A spring 9 compresses the cells. It may suitably be made from resilient soft rubber only and be placed 10 between two cells thus exerting pressure on both cells. Alternatively a spring 9 and a resilient rubber means 10 between the cells are combined as is shown in FIG. 6. The cell walls are thin and the cells are placed in an outer constant volume container 13.

The description and the figures illustrate examples of constructions according to the invention.

Circular cylindrical batteries most easily take up the pressure without change of volume and may therefore have thin walls.

If the containers are rigid enough, the electrodes and the cross section of the cells may have other forms, e.g. rectangular. Ordinary starting battery plates may be used resulting in a very long life battery, the same as or better than the tubular batteries of today. To obtain better current distribution these rectangular plates 12 may have the lugs 3 located opposite to each other and have two or three lugs or one lug as wide as the electrode, FIG. 7, and being having as small height as possible. The profiles 5 surround the electrodes on all sides, however the profiles are provided with apertures in the profile where the lugs protrude, and are assembled with a support all around the electrode from the container wall. In a similar way as with circular electrodes the separators 2 are placed between the electrodes.

It should be noted that by "first or radial directions" is intended directions from the periphery and inwards, also for electrodes with other forms than circular. By "a second or axial direction" is intended a direction perpendicular to the first directions, i.e. in a length direction of an electrode pile.

If the containers are mechanically week, they can, as is shown in FIG. 6, be fitted exactly into a rigid outer container with constant volume 13, and since each single plate is supported by the walls of the cell, the circumference of the electrodes will be maintained during discharge without possibility of expanding in any direction, whilst the thickness of the electrode is controlled by resilient pressure.

If rectangular electrodes are used (starting battery plates), they may be enclosed into rectangular tubes with constant volume. Circular tubes may however be made essentially lighter at high pressure and therefore rectangular electrodes may be enclosed into circular tubes if the electrodes are supported on all four sides by supporting profiles 15 which contact the outer container 13 as is shown in FIGS. 8A, B.

The supporting profiles 18' may be slotted and perforated, FIGS. 8B, C and comprise cavities with for example extra electrolyte absorbing glass wool 19 in order to create extra acid volume. Porous separators 2 saturated with electrolyte may be made larger than the electrodes and contact the plastic support and extend to the outer wall. The electrolyte volume becomes larger without increasing the electrode distance. The outer container 13 may be made of steel for easier cooling. According to the above, the conductors 6 can be provided with an expansion coil if a certain expansion of the electrode during the discharge is desired.

Ordinary lead grids for conduction of current and securing the paste, FIG. 5A, have staggered grids 14 for better securing the paste and are in that case provided with a lead frame 15 around the grid. The high pressure in the batteries according to the invention allows the positive electrode to be made simply from a grid, which has been punched out from a lead foil 16 as current conductor, FIG. 5C. The U-profile 5 determines the thickness of the positive active material 4' on each side of the lead conductor. The grid in the positive plate corresponds to the lead spines in the tubular battery, i.e. they are centrally placed in the electrode and completely covered by the electrode paste. Since the current conductor also after having been completely reformed to $PbO_2$ shall work with reasonable low resistance, the thickness shall not be to small compared to the plate thickness.

The absolute limitation and control of the volume according to the invention will allow the electrodes in power batteries to be made very thin, in certain cases 0.5 mm or less, with active material received from so called Plante' formation of the lead in the positive electrode. Because of the high pressure and the current connectors being placed opposite to each other, these batteries will have an even current distribution which is very important with respect to a current conductor converted to $PbO_2$. The electrodes in these cells should have an extra high pressure for maximum conductivity of $PbO_2$ in the current conducting parts.

In order to obtain entirely closed cells with high so called oxygen recombination, the pressure of the liquid in the cells shall be high, 4–10 atm or higher. At this pressure the solubility of the oxygen is so high that the oxygen which is formed during charging, before the hydrogen, in its soluted form oxidises the negative plate, which therefore is not fully charged and hydrogen gas formation is prevented. With the mechanical strength of the cells according to the invention such liquid pressure may easily be maintained. This high liquid pressure is also part of the invention.

In order to decrease the gas pressure in the case of maltreatment, the cells have been provided by safety valves.

We claim:

1. A lead acid battery comprising a container having walls, at least one positive electrode and one negative plate-shaped electrode, separators and sulphuric acid, each of said electrodes having a projected area, wherein the projected area of at least one of the electrodes is maintained in a first direction by the walls of the container, said container able to counteract pressure from the electrodes, and means for restricting growth of the electrodes during cycling in a direction perpendicular to said first direction.

2. A battery according to claim 1, wherein the container includes a safety valve for relieving excess pressure.

3. A battery according to claim 1, wherein the electrodes comprise current conducting lead grids having active material, wherein conductivity of $PbO_2$ in corroded grids is increased by application of pressure on surfaces of the electrodes of about at least $0.49 \cdot 10^5$ Pa.

4. A battery according to claim 3 wherein lead conductors formed into $PbO_2$ function as current conducting elements with a lead lug and plastic grids.

5. A battery according to claim 1 further comprising a resilient insert inside the container to enable expansion of the active material during discharge and to reduce expansion of expanded active material during charge.

6. A battery according to claim 5 wherein the discharge is regulated by pressure on the electrodes.

7. A battery according to claim 6 wherein pressure of about $1.0 \cdot 10^6$ Pa is applied to obtain oxygen recombination.

8. A battery according to claim 1 wherein current connections to the electrodes are located on opposite sides of the electrodes.

9. A battery according to claim 1, wherein space between the electrodes and the container are filled with supporting profiles (15',15").

10. A battery according to claim 3 wherein the pressure is about $0.98 \cdot 10^5 - 9.81 \cdot 10^5$ Pa.

11. A battery according to claim 3 wherein the pressure is about $0.49 \cdot 10^5$–about $0.98 \cdot 10^5$ Pa.

12. A lead-sulphuric acid battery having at least one cell, each cell having a volume having at least one positive electrode and one negative plate-shaped electrode separated by separators and contained within a container which defines radial directions and an axial direction, wherein said electrodes, separators and sulphuric acid fill the volume of each cell, and wherein the circumference of the electrodes contacts walls of the container, said walls having constancy of volume and surfaces of said electrodes arranged to be compressed in the axial direction by a pressure of about $0.49 \cdot 10^5$–about $9.81 \cdot 10^5$ Pa.

13. A battery according to claim 12 wherein the separators impart a resilient affect on the cell or cell group under said pressure to allow an expansion of up to about 15% of the thicknesses of the electrodes and to reduce said expansion.

14. A battery according to claim 13 wherein the container is tube-shaped with the electrodes placed in a 90° angle with respect to the length of the tube, and the container comprises end sections able to withstand pressure from inside the battery.

15. A battery with long life according to claim 14, wherein the pressure is about $0.98 \cdot 10^5$–about $9.81 \cdot 10^5$ Pa.

16. A battery with high capacity according to claim 14, wherein the pressure is about $0.49 \cdot 10^5$–about $0.98 \cdot 10^5$ Pa.

17. A lead-acid battery with one or more cells each having an interior volume having at least one positive and one negative electrode, separators and sulphuric acid, and a tubular container defining an axial direction and radial directions, wherein the interior volume of each cell is filled by the positive electrode, negative electrode, separator and sulphuric acid, and wherein the electrodes are restrained from movement in the radial directions by tubular walls of the container and from movement in the axial direction by application of a pressure of about $0.49 \cdot 10^5$–about $9.81 \cdot 10^5$ Pa, and a seal is provided for maintaining internal pressure generated during battery cycling.

18. A lead-acid battery according to claim 17, wherein a seal is provided for each cell whereby each cell maintains internal pressure generated during battery cycling up to about $1.0 \cdot 10^6$ Pa.

19. A lead-acid battery according to claim 18, further providing a means for relief of excess gas pressure.

20. A lead-acid battery according to claim 17, wherein the pressure is about $0.98 \cdot 10^5$–about $9.81 \cdot 10^5$ Pa.

21. A lead-acid battery according to claim 17, wherein the pressure is about $0.49 \cdot 10^5$–about $0.98 \cdot 10^5$ Pa.

22. A lead-acid battery having a plurality of cells wherein each cell comprises at least one positive electrode and one negative, plate-shaped electrode, at least two lead bars, at least one separator, an electrolyte comprising sulphuric acid, and a container, wherein the container is tubular for defining an axial direction and radial directions, each electrode having an circular cross-section and a current collecting lug placed at an outer periphery of the electrode, the electrodes arranged with their circular cross-section transverse to the axial direction of the container and are restricted from movement in the axial direction by mechanical pressure of about $0.49 \cdot 10^5$ Pa to about $9.81 \cdot 10^5$ Pa applied in the axial direction, whereby lugs of at least one negative electrode is in electrical contact with a first lead bar, lugs of at least one positive electrode is in electrical contact with a second lead bar, and the electrodes are surrounded by a non-electrically conducting U-profile in contact with an inner surface of the container to support the electrodes to prevent direct contact between the electrodes and the container and to restrict movement of the electrodes in radial directions.

23. A lead-acid battery according to claim 22, wherein the pressure is about $0.98 \cdot 10^5$–about $9.81 \cdot 10^5$ Pa.

24. A lead-acid battery according to claim 22, wherein the pressure is about $0.49 \cdot 10^5$ Pa to about $0.98 \cdot 10^5$ Pa.

25. A battery according to claim 3 wherein the pressure is about $0.98 \cdot 10^5$ to about $9.81 \cdot 10^5$ Pa.

26. The battery of claim 1 wherein the projected area of at least one of the electrodes is maintained unchanged.

* * * * *